R. D. LANK.
AUTOMATIC DISH WASHER.
APPLICATION FILED SEPT. 8, 1915.

1,201,475.

Patented Oct. 17, 1916.

7 SHEETS—SHEET 1.

Witnesses:

Inventor:
Roy D. Lank,
By Frederick Whyen,
Attorney

R. D. LANK.
AUTOMATIC DISH WASHER.
APPLICATION FILED SEPT. 8, 1915.

1,201,475.

Patented Oct. 17, 1916.
7 SHEETS—SHEET 2.

Witnesses:

Inventor:
Roy D. Lank.
By Frederick W. Ryon,
Attorney

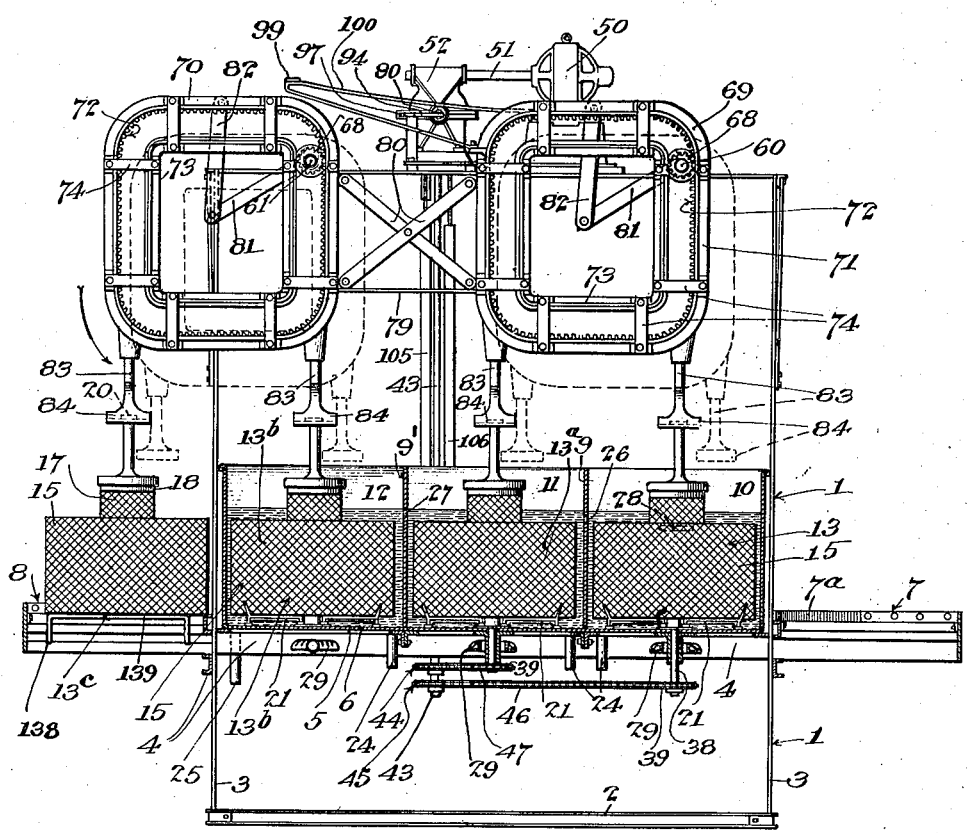
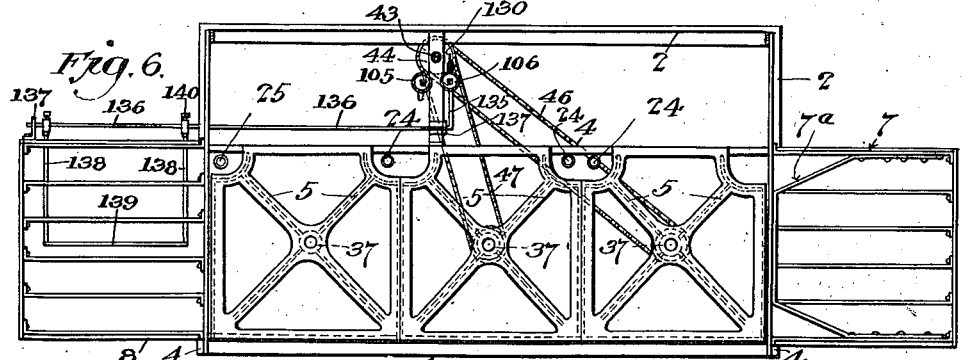

R. D. LANK.
AUTOMATIC DISH WASHER.
APPLICATION FILED SEPT. 8, 1915.
1,201,475.
Patented Oct. 17, 1916.
7 SHEETS—SHEET 4.
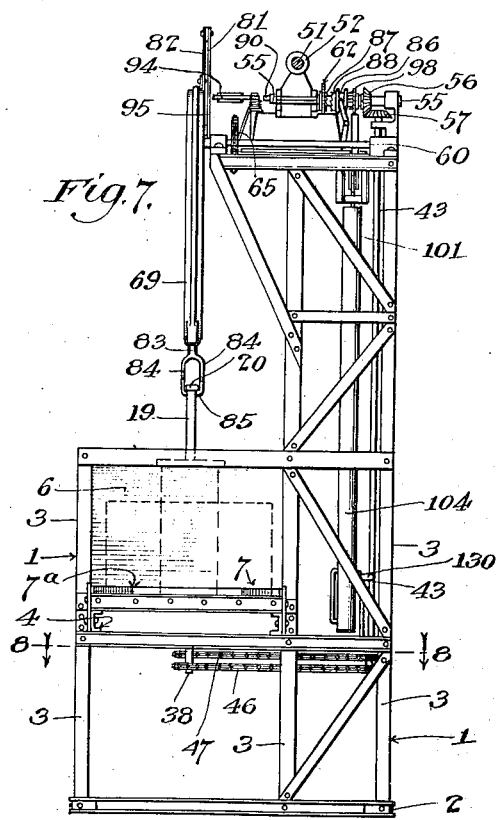
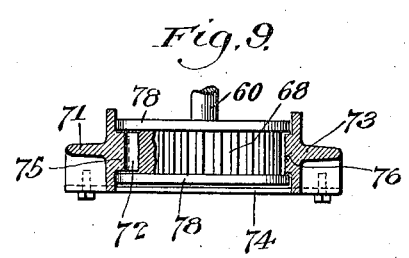
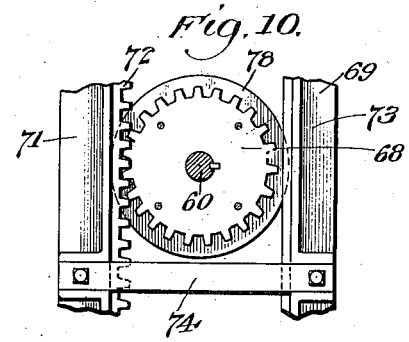
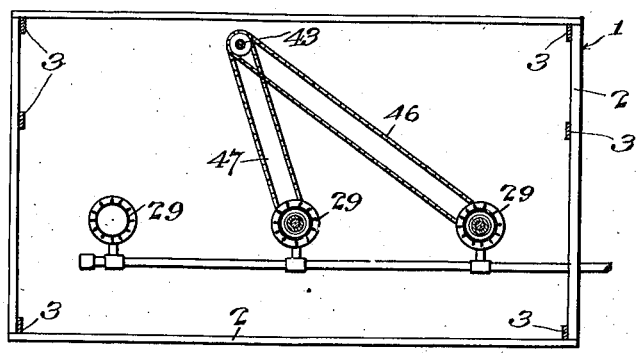
Inventor:
Roy D. Lank.

R. D. LANK.
AUTOMATIC DISH WASHER.
APPLICATION FILED SEPT. 8, 1915.

1,201,475.

Patented Oct. 17, 1916.
7 SHEETS—SHEET 5.

Witnesses:

Inventor:
Roy D. Lank

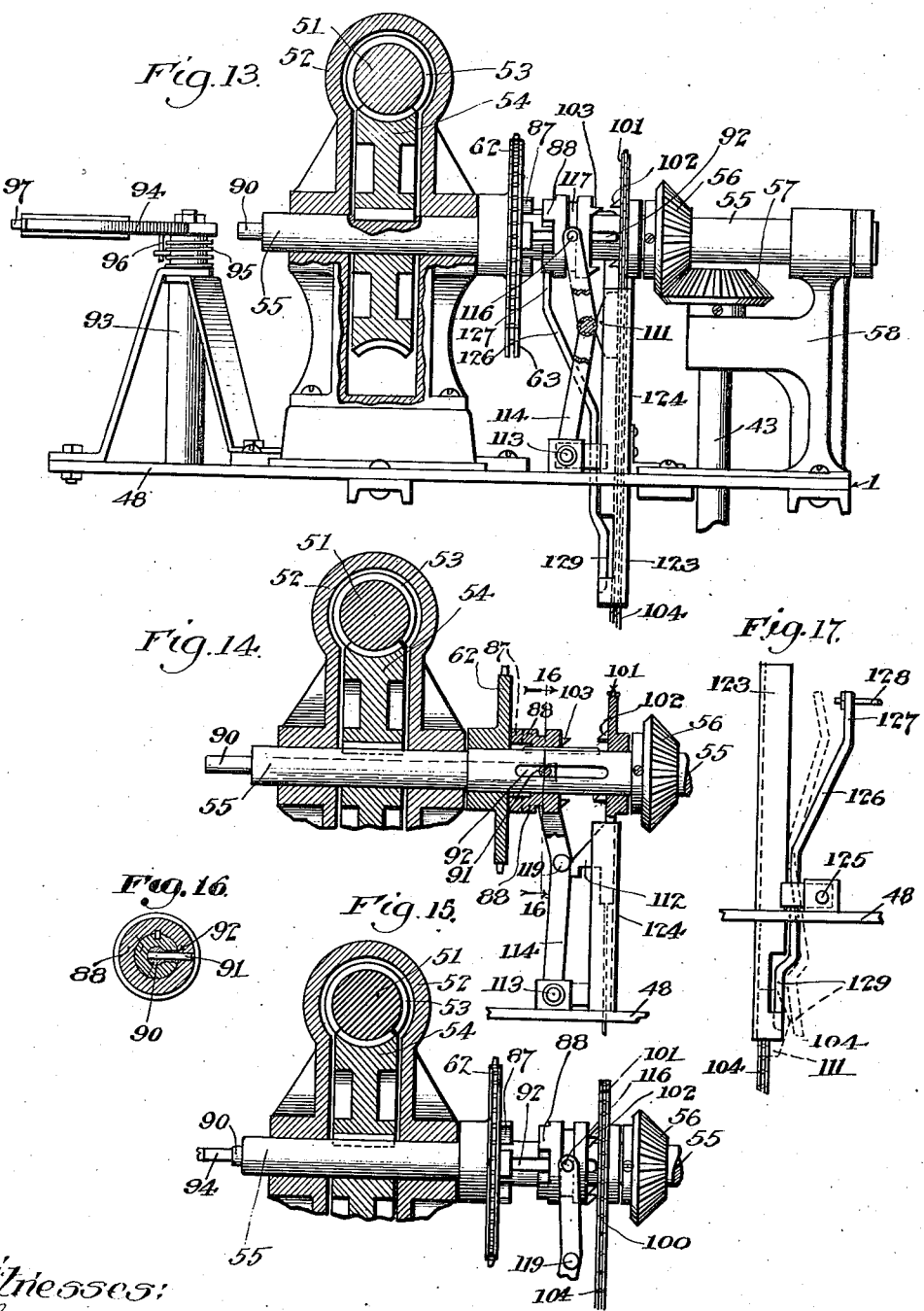

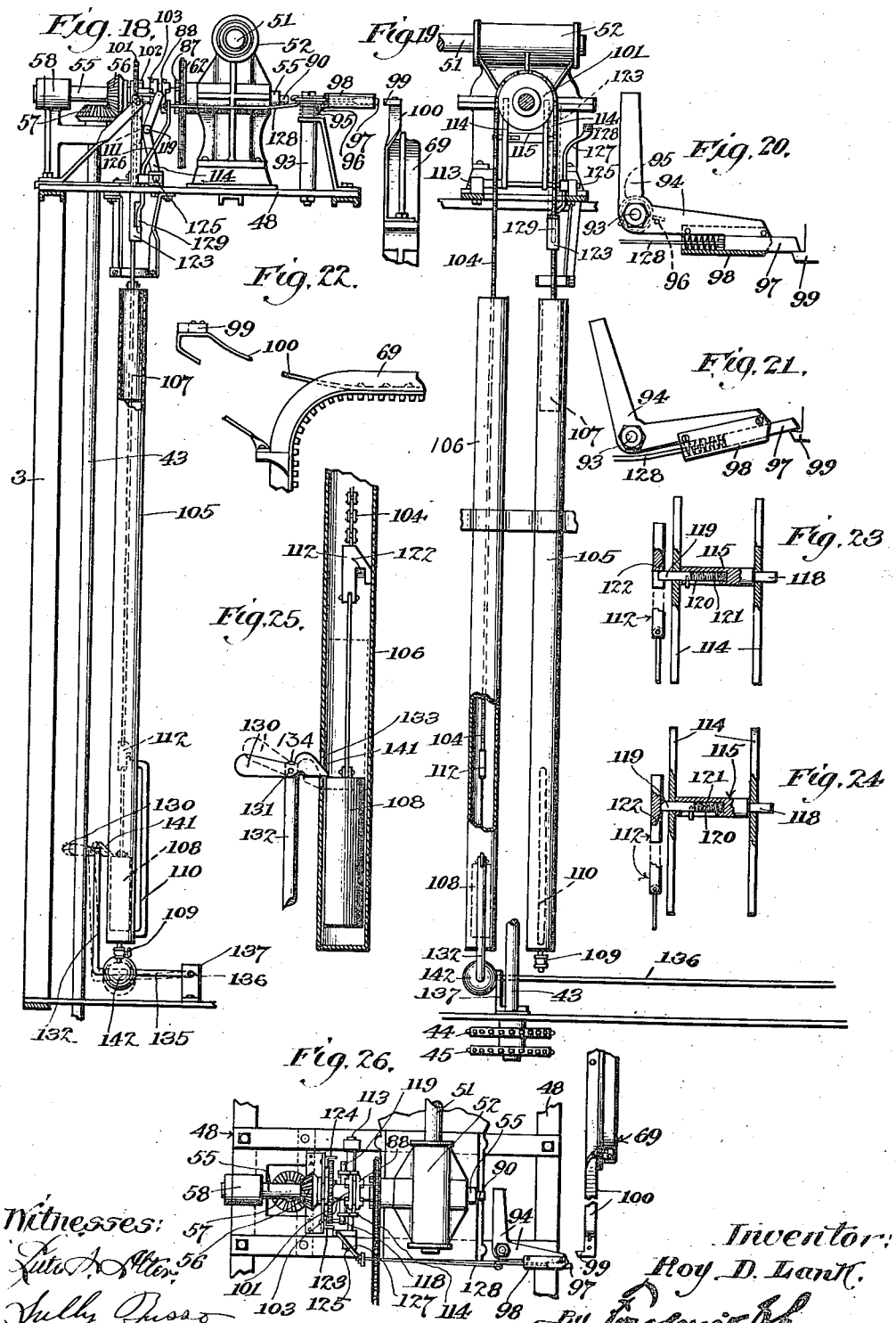

UNITED STATES PATENT OFFICE.

ROY D. LANK, OF LOS ANGELES, CALIFORNIA.

AUTOMATIC DISH-WASHER.

1,201,475.  Specification of Letters Patent.  Patented Oct. 17, 1916.

Application filed September 8, 1915.  Serial No. 49,436.

*To all whom it may concern:*

Be it known that I, ROY D. LANK, a citizen of the United States, residing at Los Angeles, in the county of Los Angeles and State of California, have invented a new and useful Automatic Dish-Washer, of which the following is a specification.

This invention relates to improvements in dish-washing machines and an object of the invention is to provide a machine which will be entirely automatic in operation and capable of effectively washing and rinsing a large number of dishes in a comparatively short time without breakage of the dishes.

Another object of this invention is to generally improve and simplify the construction and operation of automatic dish washing machines so as to render them more practical, capable of handling larger numbers of dishes, and inexpensive to manufacture and maintain in operation.

A further object of this invention is to provide safety means which will prevent the breakage of dishes and the derangement of the machine in general.

The invention consists in certain novel features of construction and combinations, and arrangement of parts as will be more fully hereinafter described and pointed out in the claims.

Figure 1:
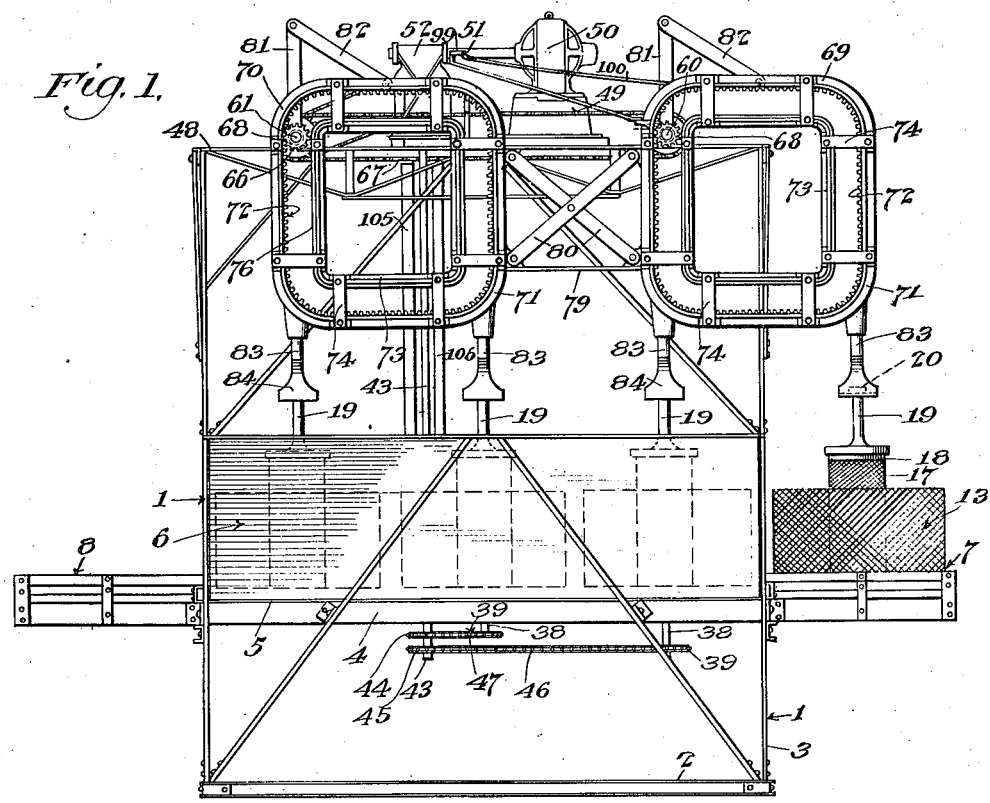
Figure 4:
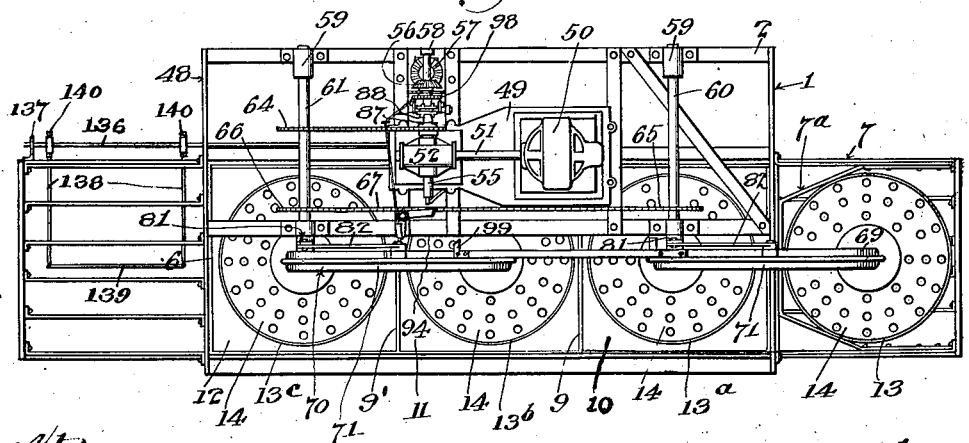
Figure 2:
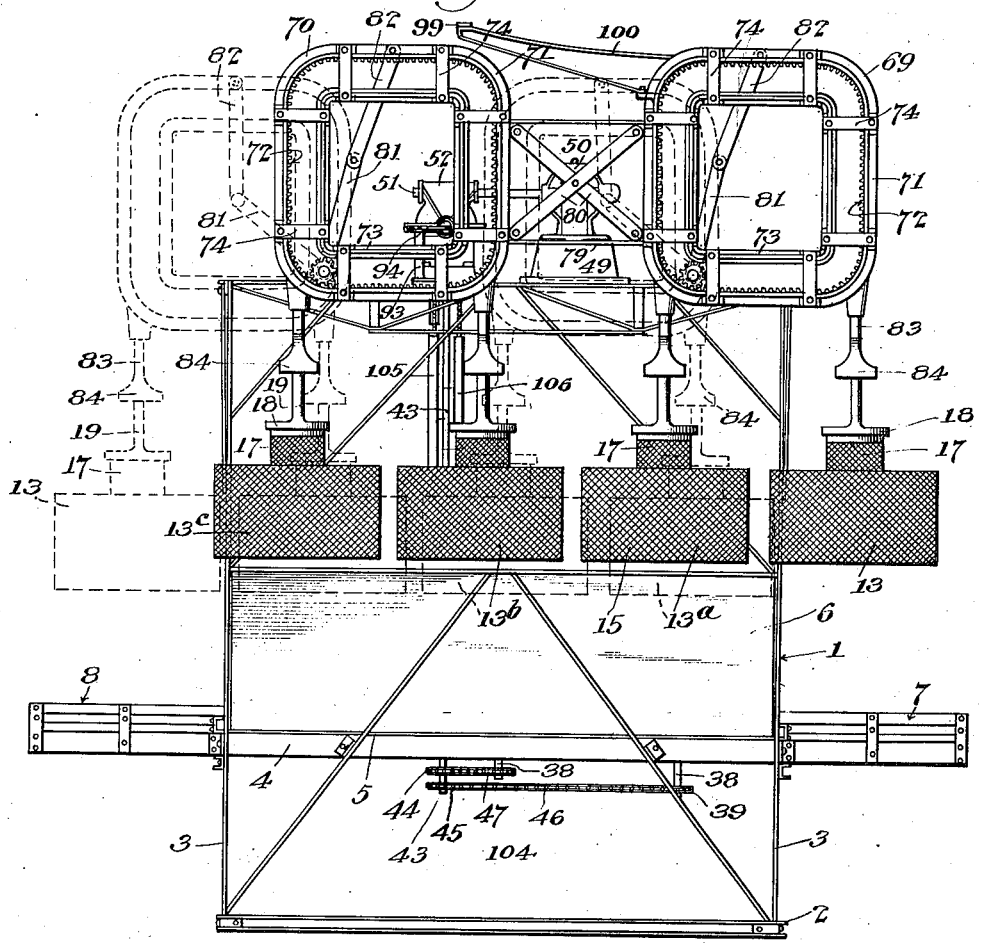
Figure 5:
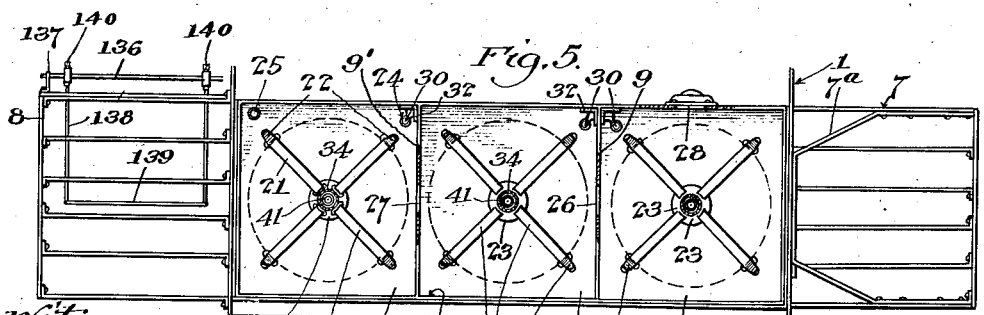
Figure 11:
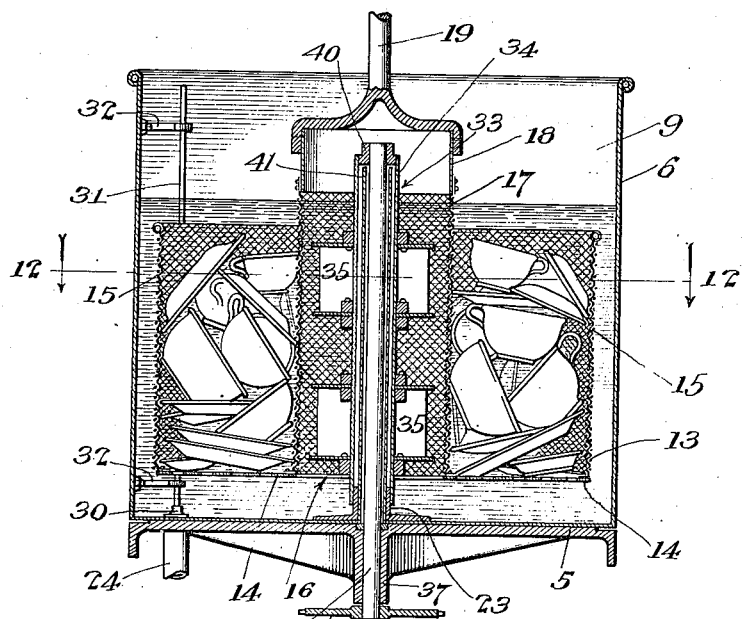
Figure 12:
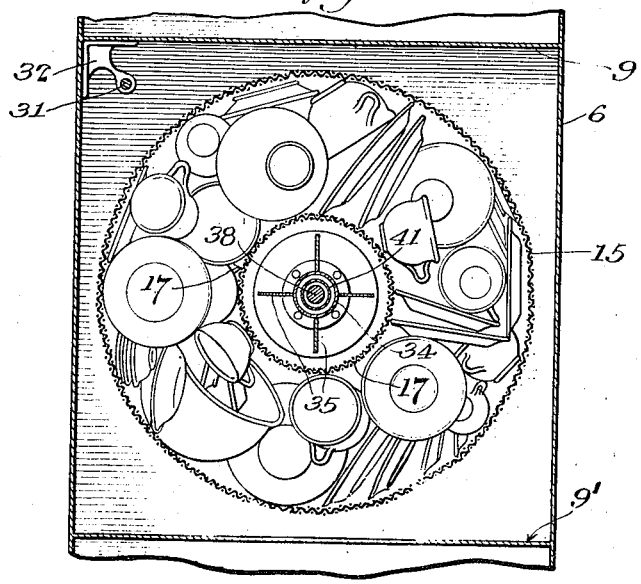

Referring to the drawings: Figure 1 is a front elevation of the machine showing the mechanism in the first position; Fig. 2 is a front elevation showing the mechanism in the second position in full lines and beginning with the third position in dotted lines; Fig. 3 is a front elevation partly in section showing the mechanism in final position in full lines and moved out of final position in dotted lines; Fig. 4 is a top plan view; Fig. 5 is a top plan view of the tanks and frame therefor with parts of the device removed for the sake of clearness; Fig. 6 is a plan view of the body of the supporting frame for the device with parts removed; Fig. 7 is an end elevation; Fig. 8 is a horizontal sectional view taken on line 8—8 of Fig. 7; Fig. 9 is an enlarged horizontal sectional view of one of the traveling frames; Fig. 10 is a fragmental side elevation of one of the elements; Fig. 11 is an enlarged vertical sectional view of one of the tanks showing a dish container or receptacle in position therein and in section. Fig. 12 is a horizontal sectional view taken on line 12—12 of Fig. 11; Fig. 13 is an enlarged side elevation of the operating means showing it partly in section; Fig. 14 is a fragmental side elevation of part of the operating means showing it partly in section and in a different position relative to that shown in Fig. 13; Fig. 15 is a fragmental side elevation of the operating means showing it partly in section and in a different position relative to Figs. 13 and 14; Fig. 16 is a vertical sectional view taken on line 16—16 of Fig. 14; Fig. 17 is an enlarged detail side elevation of the releasing mechanism; Fig. 18 is an enlarged elevation partly in section of the clutch controlling and operating means; Fig. 19 is a rear elevation partly in section of the clutch operating and controlling means; Fig. 20 is an enlarged top plan view of the means for initially operating the clutch, showing it in normal position. Fig. 21 is a detail top plan view of the clutch operating means shown in Fig. 20, shown in operative position. Fig. 22 is a fragmentary detail front elevation of the operating member for coöperation with the clutch means shown in Figs. 20 and 21. Fig. 23 is a detail view partly in section of the clutch-throwing arms showing a part of the operating means therefor. Fig. 24 is a detail side elevation partly in section illustrating the arms shown in Fig. 23 and the operating means therefor, showing said operating means in a different position; Fig. 25 is an enlarged detail vertical sectional view of the safety means; and Fig. 26 is a fragmentary top plan view of the clutch operating means and driving means for the device.

The invention consists essentially in a supporting frame, a large container divided to form soapy and clear water tanks mounted on the frame, a number of reticulated dish-containing baskets, automatic means to place the baskets successively in the tanks and remove them after they have been left in the tanks sufficiently long to provide for the washing and rinsing of the dishes, and means to agitate the liquid in the tank, to wash the dishes.

Referring to the drawings by characters of reference, 1 designates as an entirety the supporting frame work which comprises a skeleton rectangular base 2 to which is secured a plurality of upstanding posts 3. Supported upon the posts 3 is a skeleton table designated 4 as an entirety and which comprises a plurality of tank supporting sections 5 each being of skeleton construction and disposed in a horizontal plane to support a preferably rectangular container 6. From the ends of the table 4 project skeleton shelves 7 and 8 which are constructed to support the dish baskets or containers. The shelf 7 is provided with a guide flange 7ª which engages the baskets when the latter are placed on the shelf and causes them to assume a position to be engaged and operated upon by the operating means to be later described.

The container 6 is divided by two partition walls 9 and 9', into three tanks or compartments designated 10, 11 and 12 respectively. The tanks 10, 11 and 12 are of equal size and are to contain soapy and clear water, the tank 12 containing the clear or rinsing water.

A plurality of reticulated baskets or receptacles 13, 13ª, 13ᵇ and 13ᶜ are provided for the tanks. Each of these baskets is preferably circular and consists of a perforated metal bottom 14 to which is secured an annular strip of wire netting or other foraminous material 15 to form the side wall of the basket. A circular central opening 16 is provided in the bottom 14 and secured about the edge of the opening 16 and extending upwardly to a point above the side wall 15 is a cylindrical wire net cage 17. Secured to the upper edge of the cage 17 is an annular band 18 which carries a handle member 19. The member 19 is formed with an enlarged annular head 20.

Mounted upon the bottom of each of the tanks 10, 11, 12, is a basket supporting member comprising a plurality of radially extending horizontal arms 21 that are formed with feet which space the arms from the bottom of the tank, and are also provided with upwardly and outwardly inclined projections 22 which engage the sides of the baskets. These arms 21 are secured to a bearing member 23 that is suitably attached to the bottom of each tank. The projections 22 provide for the centering of the baskets within the tanks. A plurality of drain pipes 24 are connected with the bottoms of the tanks and an inlet pipe 25 is connected with the bottom wall of the tank 12.

To provide for the proper drainage of greasy and dirty water from the tanks and prevent accumulation of greasy water in the rinsing tank 12, there is provided in the partition wall 9 which divides the tanks 10 and 11, an opening 26 which is located at a point slightly below the operative level of the tanks. In the partition wall 9' is formed a similar opening 27 which is arranged nearer to the operative liquid level than the opening 26, or, in other words, is higher than the opening 26. Greasy water which may have gotten into the tank 12 will readily drain into the tank 11 through the opening 27 and as more greasy water is contained in the tank 11 it will be drained through the opening 26 into the tank 10. A drain opening 28 is formed in the outer side wall of the tank 10 and at a point below the opening 26. This opening 28 provides for the complete drainage of greasy water from the tanks. Gas or other suitable heating burners 29 are arranged under the tanks to provide for the heating of the water in said tanks. The openings in the tanks 10, 11 and 12 which communicate with the drain pipes 24 are normally closed by valves 30. The stems 31 of these valves are vertically slidable within brackets 32 secured to the tanks, and extend above the liquid level of the tanks so that the valves may be readily opened and closed.

An agitator 33 is carried within the center of each of the tanks and arranged to extend into the cages 17 of the baskets. The agitator 33 comprises a tubular body 34 to which are secured sets of agitating vanes or blades 35. The lower end of the body 34 telescopes the bearing member 23 and rotates freely thereon. A depending bearing 37 is formed on the center of each of the frame sections 5 and mounted in each bearing is a vertical rotary shaft 38 on the lower end of which is keyed a sprocket wheel 39. The shaft 38 extends upwardly through the body 34 and at its upper end is connected with the upper end of the body by means of a cap 40 which is fixed to both shaft and body. To prevent the liquid in the tanks from gaining access to the bearings 37 and leaking therethrough, a tubular guard member 41 is placed within each body 34 and at its lower end is secured within the member 23. The upper end of the guard 41 is located near the cap 40 and said guard is of less diameter than the body so that the body will rotate freely. When the shaft is rotated the agitator vanes or blades 35 move correspondingly and the liquid in the tank is caused to circulate rapidly through the reticulated basket 13 and about the dishes in the basket, causing them to be cleaned. Only the tanks 10 and 11 are provided with agitators 33. A driving shaft 43 is carried by the frame 1, as will be later more fully described, and has sprockets 44 and 45 keyed thereon. Chains 46 and 47 operatively connect the shafts 38 for the tanks 10 and 11 with the sprockets 44 and 45.

The means for lifting the baskets, successively placing them in the tanks, allowing them to remain in the tanks for a short period and then removing them successively, will now be described as follows: Mounted upon the upper horizontal structure 48 of the frame 1 and upon a suitable base 49 is a motor 50. The shaft 51 of the motor extends into a gear casing 52 and fixed on the shaft 51 is a worm 53 which meshes with a worm wheel 54. The wheel 54 is keyed upon a horizontal tubular shaft 55 which is journaled transversely through the casing 52. A beveled pinion 56 is keyed upon the shaft 55, near one end of said shaft and meshes with a pinion 57 fixed to the upper end of the driving shaft 43. An upstanding bearing 58 is fixed to the upper frame 48 and receives the shafts 55 and 43.

Mounted in suitable bearings 59 on the upper frame 48 are horizontal operating shafts 60 and 61. Loosely mounted upon the shaft 55 is a sprocket wheel 62. A chain 63 is mounted upon the sprocket 62 and upon a sprocket 64 which is keyed upon the shaft 61. Sprocket wheels 65 and 66 are mounted on the shafts 60 and 61 respectively, and a chain 67 is connected with said sprockets so as to transmit motion from the shaft 61 to the one 60. The clutch means for locking the gear 62 with the shaft 55 will be later more fully described.

Fixed on the outer ends of the shafts 60 and 61 are pinions 68 which are arranged to operate, horizontally, reciprocating, lifting and lowering members 69 and 70. Each of these elements is formed in the nature of a rectangular frame provided with rounded corners and when in operation move first vertically upwardly, then horizontally forwardly, then downwardly vertically, and back to initial position in a horizontal path lower than the first horizontal path. At the time that the elements 69 and 70 change from horizontal to vertical movements or vice versa, they describe an arcuate path, this being due to the rounded corners on the elements. The elements 69 and 70 might be said to describe a substantially rectangular path. Each element comprises an outer frame piece 71 which is formed on its inner face with gear teeth 72 and might be compared to a continuous rack bar. An inner frame section 73 is secured in spaced relation to the teeth 72 and to the frame member 71 by means of connecting strips 74. The teeth 72 on the frame member 71 are formed on the outer face of a circumferential projection or rib 75, which rib is formed on the inner face of the member 71. A projection or rib 76 similar to the one 75 is formed on the outer face of the inner frame member 73. Each of the pinions 68 carry on opposed faces thereof angular flanges or disks 78 which are of greater diameter than the pinions and engage upon opposite sides of the projections 75 and 76 so as to guide the pinions in meshing relation to the teeth 72, and form bearings for the pinions at all times. This arrangement is clearly illustrated in Figs. 9 and 10 of the drawings.

The connecting members 74 are arranged so as to pass the pinions 68 and coöperating parts, without interference. The members 69 and 70 are rigidly secured to one another in the same plane by means of bars or rods 79 and crossed braces 80 as shown in Fig. 3 of the drawings.

To steady and guide the members in their rectangular movement there are provided upstanding arms 81 that are secured to the shafts 60 and 61 or some other upper part of the frame work. Links 82 are pivoted to the arms 81 and the upper portion of the members 69 and 70. The pinions rotate in a clockwise direction and it will be seen that the members 69 and 70 move in a substantially rectangular path owing to the arrangement of the rack teeth 72 and the shape of the elements 69 and 70.

Depending from each element is a pair of spaced basket handle engaging and lifting members 83. The lifting members of each pair comprise rods having spaced arms 84 on their lower end. The arms 84 are provided with inwardly turned lower ends 85 which are designed to engage with the under faces of the heads 20 on the handles 19. The inwardly turned portions 85 are of greater length than the diameter of the heads 20 and are arranged to be moved freely into and out of clamping engagement with the head, the handles 19 being of less diameter than the space between the portions 85 and located in the path of the members 83. The arms 84 on the members 83 are arranged in such manner that four baskets may be grasped and operated upon. While I have shown only four elements it is to be understood that any number of the elements 83 and baskets may be used, more than one of the members 69 and 70 may be used and if desired three of the members 83 may be carried thereby instead of two, as shown in the drawings.

Carried by the sprocket 62 is a clutch element 87. This element 87 is designed to coöperate with a clutch element 88 which is splined upon the shaft 55. Slidably mounted within the tubular shaft 55 is an operating rod 90. A pin 91 is carried by the rod 90 and projects outwardly at right angles therefrom through a longitudinal slot 92 formed in the shaft 55. This pin 91 is extended into an aperture in the element 88 and locks said element for rotation with the shaft 55. This arrangement is illustrated in detail in Figs. 14 and 16 of the drawings. The clutch members 87 and 88 are normally in engagement with one another and the rod 90 projects from the outer end of the shaft 55.

Pivotally mounted upon an upstanding bracket 93 is a bell crank 94 constituting a part of a clutch operating means for causing the starting and stopping of the device. This crank 94 is arranged to move in a horizontal plane and has one end located so as to engage and move the rod 90 at certain times during the operation of the machine. A spring 95 is mounted on the bracket 93 and connected to a depending pin 96 carried on the crank 94. This spring serves to hold the crank in position to be engaged and moved by the member 69.

Carried on the crank 94 near the outer end thereof is a spring-pressed finger 97 slidable in a housing 98 therefor which is secured to the crank. This finger 97 is normally extended beyond the outer end of the crank 94 and is adapted to be engaged by a projection or lug 99 which is carried upon a bracket 100 secured to the lifting and lowering member 69. The bracket 100 projects from the upper end of the member 69 toward the member 70. The projection or lug 99 and the finger 97 are provided with beveled ends so as to prevent derangement of each other during the operation of the machine. During the movement of the members 69 and 70 the projection 99 engages the finger 97 and moves said bell crank, causing the latter to engage the rod 90 and move it inwardly. Such movement of the rod 90 causes the clutch member 88 to move out of engagement with the clutch member 87 and since the sprocket wheel is loose on the shaft 55 no further motion will be imparted to the members 69 and 70. It will thus be seen that the members 69 and 70 are caused to stop for a predetermined length of time so as to allow the baskets containing the dishes to remain in the tanks sufficiently long to provide for a thorough cleaning and rinsing of the dishes in the baskets. I provide means for causing the members 69 and 70 to resume operation after being held to allow the baskets to remain in the tanks, which operates to move the clutch members back into coöperative position and comprises a sprocket wheel 101, loosely mounted on the shaft 55 and provided with a clutch member 102 on the face thereof opposed to the clutch member 88. The clutch member 88 is provided with clutch teeth 103 upon the face thereof opposed to the clutch member 102 and said teeth 103 are adapted to coöperate with the clutch 102.

A sprocket chain 104 is mounted upon the sprocket wheel 101 and depends from said wheel 101 into upright cylindrical dash pots 105, 106, said dash pots being suitably supported by the general frame work of the machine. Weights 107 and 108 are secured to the free ends of the chains and adapted to slide up and down within the dash pots 105, 106, said weights effecting a close engagement with the inner faces of the dash pots and being only of slightly less diameter than the inside diameter of said dash pots. The weight 107 is considerably heavier than the weight 108 and is normally held in the lower end of the dash pot 105, whereas, the weight 108 is held adjacent to the upper end of the dash pot 106. A suitable valve 109 is located by the lower end of the dash pot 105 and a bypass pipe 110 is connected with the lower portion of the dash pot and provides means for allowing the air cushion formed at the lower end of the pot to escape before the weight has dropped the maximum extent, thus causing the weight to drop suddenly for the remainder of the distance and a sudden jerk to be produced in the chain 104. This is for the purpose of effecting a quick throwing of the clutch and to insure the coöperation of the clutch members as will be later more fully described. Secured to the chain 104 above and near to the weight 107 is a cam or projection 111. A similar projection or cam 112 is secured to the chain 104 near the other end thereof and above the weight 108.

Pivotally mounted as at 113 upon the upper frame 48 and beneath the clutch members 87, 88, etc., is a clutch shifting means comprising a pair of opposed upwardly extending arms 114 connected intermediate their ends by a connecting piece 115. These arms 114 are connected at their upper ends to the opposite sides of the clutch member 88, said upper ends having pins 116 projecting inwardly therefrom and seated in a circumferential groove 117 formed in the clutch member 88 so as to allow for relative turning of said clutch member. The arms 114 are bowed and extend inwardly toward the sprocket 62, and projecting from the outer side of each arm at points opposite one another and in line with the member 115 are lugs 118 and 119 which are designed to be engaged by the cams 111 and 112, respectively. The lug 119 is slidable within a bore 120 therefor formed within the member 115 and is normally held outwardly in operative position by means of a spring 121 in said bore. The upper face of the lug 119 on the outer end thereof is beveled so as to coöperate with the beveled under face 122 of the cam 112. Angle iron guide members 123 and 124 are secured to the upper frame 48 and extend from the under side of the sprocket 101 to and below the frame 48 so as to guide the chain 104 during its movement and insure the striking of the cams 111 and 112 with the projections 118 and 119.

Pivoted intermediate its ends upon the upper frame 48 as at 125 is a releasing trigger 126 which has an outwardly offset portion 127 that is connected by means of a rod 128 with the spring-pressed projection 97. The lower end 129 of this trigger 126 is offset in the opposite direction as compared to the upper end 127 and is located adjacent to the guide 123 and in the path of the cam 111 on the chain 104 so as to be engaged and moved by said cam.

I provide means for preventing the machine from placing a basket upon the supporting means 8 therefor when said supporting means is occupied by a basket of dishes which have been washed and rinsed and ought to be removed. This means also prevents the operation of the machine as long as there is a basket upon the supporting means 8 and comprises a dog 130 which is pivoted intermediate its ends as at 131 upon the upper end of an operating rod 132 therefor. An opening 133 is cut in the side of the dash pot 106 at a point near the lower end thereof and said dog projects into said opening at a point above the weight 108 so as to prevent said weight from being pulled upwardly by the weight 107 and the machine from operating. This dog 130 is pivoted between arms 134 provided by bifurcating the upper end of the rod 132 and is prevented from upward movement by its engagement with the shoulder formed between the two arms 134. The rod 132 is disposed in a vertical plane and is connected preferably integrally with a horizontal arm 135 which is in turn similarly connected with a rotatable right-angularly extending horizontal shaft 136. This shaft 136 is journaled in bearings 137 and extends along one side of the basket supporting means 8. A U-shaped trigger 138 having its mid or bight portion 139 offset upwardly, is secured at its ends by means of set screws 140 to the shaft 136. This trigger 138 is extended beneath the supporting means and the offset portion 139 projects through and above said supporting means. When a basket is placed on the supporting means 8, it engages the offset portion 139 and forces said trigger downwardly causing the shaft 136 to rotate and the rods 135 and 132 to be forced upwardly. This causes the dog which has the upper face of its inner end beveled as at 141 to be moved out of the dash pot 106 and free from holding engagement with the weight 108 but not entirely out of the opening 133. The beveled face of the dog 131 engages the upper edge of the opening 133 and the dog is thus caused to be moved as described. When the basket is lifted from the supporting means 8, a weight 142 which is secured to the rod 135 acts to return the dog 130, arms 132 and 135, shaft 136 and trigger 138 to normal position.

In operation, a basket 13, after being filled with dishes to be washed, is placed upon the shelf 7 and pushed inwardly so as to engage with the guide flange 7ª on said shelf. The motor is then started and the outermost member 83 on the member 69 will engage with the head 20 and lift the basket 13 upwardly until it has cleared the adjacent upper edge of the tank 10. The member 69 will then begin to move forwardly horizontally and then downwardly and allow the basket to rest upon the supporting arms 21 within said tank 9. The basket engages the arms 21 before the member 69 is moved downwardly, its full extent, thus upon the farther downward movement of the member 83, which movement is an arcuate one, as will be the case owing to the curved end portions of the members 69 and 70, the portions 85 of the arms 84 will disengage from the handle 19. The members 69 and 70 then move back to their initial positions, as shown in Fig. 1 of the drawings.

The agitator 33 will cause the heated water in the tank 10 to be circulated rapidly about the dishes causing them to be thoroughly cleansed. After the first basket has been lifted from the shelf 7, a second basket is placed thereon and when the member 83 on the right-hand side of the member 69 moves back into initial position it will engage with the handle of the second basket 13ª, while the second member 84 on the member 69 will engage with the first basket 13. As the lifting members 83 move back into initial position, they follow an arcuate path upwardly, and since they move in the path of the handles 19, the portions 85 of said members 83 engage with the under faces of the heads 20 of the handles 19 and begin to move upwardly at the time of such engagement, thus lifting the baskets. The tanks and the shelf 7 are so arranged that when baskets are contained thereon, the handles 19 thereof are in position to be engaged as described. The elements 69 and 70 will then move in the same path as before described and the first basket 13 will be lifted from the tank 9 and placed within the tank 10 and the agitating operation or cleansing operation repeated. While this is going on a third basket 13ᵇ is placed on the shelf and after the members 83 on the member 69 disengage, the right-hand member 83 will engage with the handle on the third basket 13ᵇ, and the left-hand member engages with the handle on the second basket 13ª, while the right-hand member on the member 70 engages with the handle on the first basket 13. A fourth basket 13ᶜ is placed upon the shelf and is moved successively into the tanks 10, 11, and 12 as are the first baskets. Finally, the first basket 13 will be lifted out of the rinsing tank 12 and placed upon the shelf 8 from which it may be removed and the cleansed dishes taken from the basket and the other baskets will in turn be placed upon the shelf 8. Any number of members 69 and 70 may be employed and the number of baskets and tanks increased correspondingly.

The member 69 once during every complete movement thereof or rotation thereof about the operating pinion therefor, operates the bell crank 94 as hereinbefore defined to cause the rod 90 to move the clutch elements 87 and 88 out of engagement with each other. This provides for the leaving of the baskets in the several tanks for a predetermined length of time as the sprocket 62 is loose on the shaft 55, and by means of the sprocket chain 104 and coöperating parts the clutch elements 87 and 88 at a predetermined time are moved into coöperative position and operation of the elements 69 and 70 is resumed. The lug 99 engages the finger 97 and moves said bell crank causing one end of the crank to engage and push the rod 90 inwardly, but said lug 99 does not move past the finger 97 as when the rod 90 is forced inwardly the movement of the members 69 and 70 is stopped. The inward movement of the rod 90 causes the clutch elements 88 and 103 and 102 to be moved correspondingly and the element 103 to engage with the element 102. The weight 107 is normally at the lower end of the dash pot 105 and when the elements 103 and 102 coöperate the sprocket 101 is rotated causing the chain 104 to be pulled upwardly and to lift the weight 107. The weight moves upwardly until the projection or cam 111 engages the end 129 of the trigger 126 and moves it outwardly causing a pull to be communicated to the rod 128 and the projection 97 to be pulled inwardly out of contact with the lug or projection 99. This allows the members 69 and 70 to move when the machine is started again. After the cam 111 engages the end 129 of the trigger 126 it moves upwardly farther and engages the lug 118 so as to move the arms 114 and cause the clutch member 102 to be moved out of engagement with the teeth 103. At this time the weight 107 drops back into the dash pot 105 and the last few inches of the downward movement of the weight is permitted with increased velocity in view of the bypass 110. This jerks the chain 104 causing the lug 112 to move quickly in engagement with the lug 119 and forces the clutch element 88 to engage with the one 87. It will thus be seen that the operation of the members 69 and 70 is resumed.

With reference to the foregoing description and the accompanying drawings it will be observed that I have provided a dish washing machine in which a large number of dishes may be safely handled and thoroughly cleaned in a comparatively short time.

In practice I have found that the form of my invention illustrated in the drawing and referred to in the above description as the preferred embodiment is the most efficient and practical, yet realizing that the conditions concurrent with the adoption of my device will necessarily vary, I desire to emphasize the fact that various minor changes in construction, proportions and arrangement of parts may be resorted to when required without sacrificing any of the advantages of my invention as set forth in the appended claims.

I claim:

1. In a dish-washing machine a plurality of fluid-containing tanks, a plurality of reticulated dish-containing receptacles, means to automatically place each of the receptacles in the fluid-containing tanks, means automatically controlling said first-named means to allow the dish-containing receptacles to remain stationary in the fluid-containing tanks a predetermined length of time, and means to lift the dish-containing receptacles from the fluid-containing tanks.

2. In a dish-washing machine the combination with a fluid-containing tank, of a reticulated receptacle, means to place the reticulated receptacle in the fluid containing tank, means automatically controlling the first-named means to allow the reticulated receptacle to remain stationary in the fluid-containing tank a predetermined length of time, and means to withdraw the reticulated receptacle from the fluid-containing tank.

3. In a dish-washing machine the combination with a fluid-containing tank, of a reticulated receptacle, means to automatically place the reticulated receptacle in the fluid-containing tank, means automatically controlling the first-named means to allow the reticulated receptacle to remain stationary in the fluid-containing tank a predetermined length of time, means to withdraw the reticulated receptacle from the fluid-containing tank, and means to agitate the fluid in the fluid-containing tank.

4. In a dish-washing machine a plurality of liquid-containing tanks, means to agitate the liquid in the tanks, a plurality of reticulated receptacles, means to place the reticulated receptacles in the liquid-containing tanks, means operating on said means to allow the reticulated receptacles to remain stationary in the liquid-containing tanks a predetermined length of time and to cause the first-named means to remove the reticulated receptacles from the liquid-containing tanks.

5. In a dish-washing machine, a support, a plurality of liquid-containing tanks arranged in line on said support and in the same horizontal plane, a plurality of reticulated receptacles, means to place each of the reticulated receptacles into each of the liquid-containing tanks, means automatically operating upon said first-named means to allow each of the reticulated receptacles to remain stationary in each of the liquid-containing tanks a predetermined length of time, and means to agitate liquid in said tanks.

6. In a dish-washing machine, the combination with a support, of a plurality of liquid-containing tanks mounted on the support, a plurality of reticulated dish-containing receptacles, means to agitate the liquid in certain of the liquid containing tanks, a rectangularly movable element, means carried by the element moving in the path of the reticulated receptacle to engage with and place the reticulated receptacles successively into the tanks, then disengaging from the receptacles for a pre-determined time and reëngaging with the receptacles to move them from the tanks, and means to operate the rectangularly movable element.

7. In a dish-washing machine, the combination with a support, of a plurality of liquid-containing tanks mounted on the support, a plurality of reticulated dish-containing receptacles, means to agitate the liquid in certain of the liquid-containing tanks, a horizontally reciprocal lifting and lowering element, means carried by the element movable in the path of the reticulated receptacle to engage with and place the reticulated receptacles successively into the tanks, means to operate the said element, and means controlling said last-named means to halt the movement of said last named means a predetermined length of time whereby the reticulated receptacles are allowed to remain in the liquid-containing tanks.

8. In a dish-washing machine, the combination with a plurality of liquid-containing tanks, a plurality of reticulated dish-containing receptacles, means to place each of the reticulated dish-containing receptacles into each of the liquid-containing tanks successively and remove them therefrom, comprising a substantially rectangularly moving element and means carried by the element automatically operatively connecting and disconnecting with a plurality of the reticulated receptacles during one complete movement of said element.

9. In a dish-washing machine a plurality of tanks, dish receptacles adapted to be placed within the tanks, a receptacle-supporting shelf adjacent to the tanks, means to place the receptacles into the tanks, remove them therefrom and place them upon the shelf, and means to prevent operation of the last-named means when a receptacle is supported on the shelf.

10. In a dish-washing machine a plurality of tanks, dish receptacles adapted to be placed within and moved out of the tanks, a rectangular frame having continuous teeth on the inner edges thereof, a shaft located above the tanks, means to rotate the shaft, a pinion on the shaft supporting and meshing with the teeth of the rectangular frame, and means carried by the frame to engage and lift the receptacles during the movement of the frame.

11. In a dish-washing machine a plurality of tanks, dish receptacles adapted to be moved into and out of the tanks, rectangularly movable members located above the tanks, means carried by said members to engage and lift the receptacles whereby the receptacles are moved into and out of the tanks during the movement of the rectangularly movable members, means to operate said rectangularly movable members, automatic means to hold the operating means against operation when the receptacles are placed within the tanks and to allow said means to operate a predetermined time after the stopping thereof whereby the receptacles are removed from the tanks.

12. A dish-washing machine comprising a plurality of tanks, dish receptacles adapted to be moved into and out of the tanks, a rectangular frame having continuous teeth upon its inner edges, a smaller rectangular frame rigid with and located within said first frame, a shaft, a pinion mounted on said shaft and meshing with said teeth, means to rotate the shaft, disks carried by the pinion and engaging the opposed faces of the two rectangular frames, and means carried by said first frame to grasp the receptacles during the movement of the frame.

13. In a dish-washing machine, a plurality of tanks, dish receptacles adapted to be moved into and out of the tanks, means to place the receptacles in the tanks and to remove them therefrom, means to automatically hold said means against operation when the receptacles are in the tanks, and means to automatically start the operation of the first-named means at a predetermined time after the receptacles are placed within the tanks whereby the receptacles are removed from the tanks.

14. In a dish-washing machine a plurality of tanks, dish receptacles adapted to be mounted within and removed from the tanks, a supporting frame above the tanks, rotatable shafts mounted on the frame, a plurality of rectangular frames secured in spaced horizontal alinement to one another, continuous teeth on the inner edges of the frames, pinions on the shafts meshing with the teeth and supporting the frames, and means carried by the frames to grasp the receptacles during the movement of the frames.

15. In a dish-washing machine a plurality of tanks, dish receptacles adapted to be mounted within and removed from the tanks, a supporting frame above the tanks, rotatable shafts mounted on the frame, a plurality of rectangular frames secured in spaced horizontal alinement to one another, continuous teeth on the inner edges of the frames, pinions on the shafts meshing with the teeth and suporting the frames, handles on the receptacles having heads thereon, and handle-grasping members carried by the frames and located in alinement with the handles and comprising depending arms having inwardly turned lower ends spaced apart a distance less than the diameter of the head and greater than the diameter of the handle.

16. In a dish-washing machine a plurality of tanks, dish receptacles adapted to be mounted within and removed from the tanks, a supporting frame above the tanks, rotatable shafts mounted on the frame, a plurality of rectangular frames secured in spaced horizontal alinement to one another, continuous teeth on the inner edges of the frames, pinions on the shafts meshing with the teeth and supporting the frames, handles on the receptacles having heads thereon, and handle-grasping members carried by the frames and located in alinement with the handles and comprising spaced members spaced apart a distance less than the diameter of the head and greater than the diameter of the handle.

17. In a dish-washing machine a plurality of tanks, dish receptacles adapted to be moved into and out of the tanks, a frame located above the tanks, a drive shaft rotatably mounted upon the frame, means to move said receptacles into and out of the tanks including a gear loosely mounted on said shaft, a sliding clutch member splined on said shaft and adapted to coöperate with said loosely mounted gear to operate the receptacle-operating means, a sprocket wheel loosely mounted on said shaft, a chain mounted upon and depending from said sprocket wheel, weights secured to the ends of the chain, one of said weights being heavier than the other, means to throw said clutch member out of coöperation with said gear and into coöperation with said sprocket when the receptacles are placed within the tanks, said heavier weight being on the end of the chain that is lowered when said clutch means is thrown out, means to throw said clutch member out of engagement with the sprocket wheel when the heavier weight is elevated whereby said sprocket is free to rotate on the shaft and the heavier weight falls, and means operating when the other end of the chain is raised to throw said clutch member back into coöperation with the gear whereby the operation of the receptacle-moving means is continued.

18. In a dish-washing machine, a plurality of tanks, a plurality of tank receptacles, a frame located above the tanks, a drive shaft rotatably mounted above the frame, means to move the receptacles into and out of the tanks, a gear loosely mounted on the drive shaft and operatively connected with said means, a clutch member carried by said gear, a clutch member splined upon said shaft and normally coöperating with the first clutch member, a rod connected with the splined clutch member, a pivoted shaft-engaging member mounted on said frame, means carried by the first-named means to engage and move said last-named shaft when the receptacles are placed within the tanks whereby the splined clutch member is thrown out of coöperation with the first clutch member, and means to automatically throw said clutch member back into coöperation with the first clutch member at a predetermined time.

19. In a dish-washing machine, a drive shaft, a pair of sprocket wheels loosely mounted on said shaft, clutch members fixed to the opposed faces of the sprocket wheels, a clutch member splined upon the shaft between the sprocket wheels, dish receptacles, means to move the dish receptacles operatively connected with one of the sprocket wheels, a chain mounted upon and depending from the other of the sprocket wheels, said splined clutch member coöperating with the first-named sprocket, means to move said splined clutch member out of coöperation with the clutch member on the first-named sprocket when the receptacle-moving means moves a pre-determined distance and into coöperation with the clutch member on the other sprocket whereby one end of the chain is elevated, means operating when said end of the chain is elevated to throw said clutch member out of coöperation with the second sprocket, a weight secured to the elevated end of the chain and operating to elevate the other end of the chain when the chain sprocket is free from connection with the splined clutch member, and means carried by the other end of the chain to throw the clutch member into coöperation with the first-named sprocket.

20. In a dish washing machine a driving shaft, rotary driving members loosely mounted on the shaft and having clutch members on the opposed faces thereof, a clutch member splined on the shaft between the rotary driving members adapted for coöperation with either of said members, one of said members having teeth on the periphery thereof, a sprocket chain mounted on said member and engaging with the teeth, weight members secured to the ends of the chain, dash-pots in which said weight members operate, means for moving the splined clutch member into engagement with the tooth driving member whereby the latter is rotated and moves the chain, means for moving said splined clutch member out of engagement with said tooth driving member and into engagement with the other driving member, means carried by the chain to operate said last-named means to move the splined clutch member out of engagement with the tooth clutch member located near one end of the chain and means carried near the other end of the chain for moving the splined clutch member out of neutral position into engagement with the other driving member.

21. In a dish washing machine a driving shaft, rotary driving members loosely mounted on the shaft and having clutch members on the opposed faces thereof, a clutch member splined on the shaft between the rotary driving members adapted for coöperation with either of said members, one of said members having teeth on the periphery thereof, a sprocket chain mounted on said member and engaging with the teeth, weight members secured to the ends of the chain, dash-pots in which said weight members operate, means for moving the splined clutch member into engagement with the tooth driving member whereby the latter is rotated and moves the chain, means for moving said splined clutch member out of engagement with said tooth driving member and into engagement with the other driving member, means carried by the chain to operate said last-named means to move the splined clutch member out of engagement with the tooth clutch member located near one end of the chain and means carried near the other end of the chain for moving the splined clutch member out of neutral position into engagement with the other driving member, a plurality of dish receptacles, a shelf for supporting said receptacles, and means to hold the chain against operation when a receptacle is resting upon said shelf.

In testimony whereof, I have hereunto set my hand at Los Angeles, California, this 24th day of August, 1915.

ROY D. LANK.

In presence of—
   CHAS. J. CHUNN,
   L. BELLE WEAVER.